Figure 1:
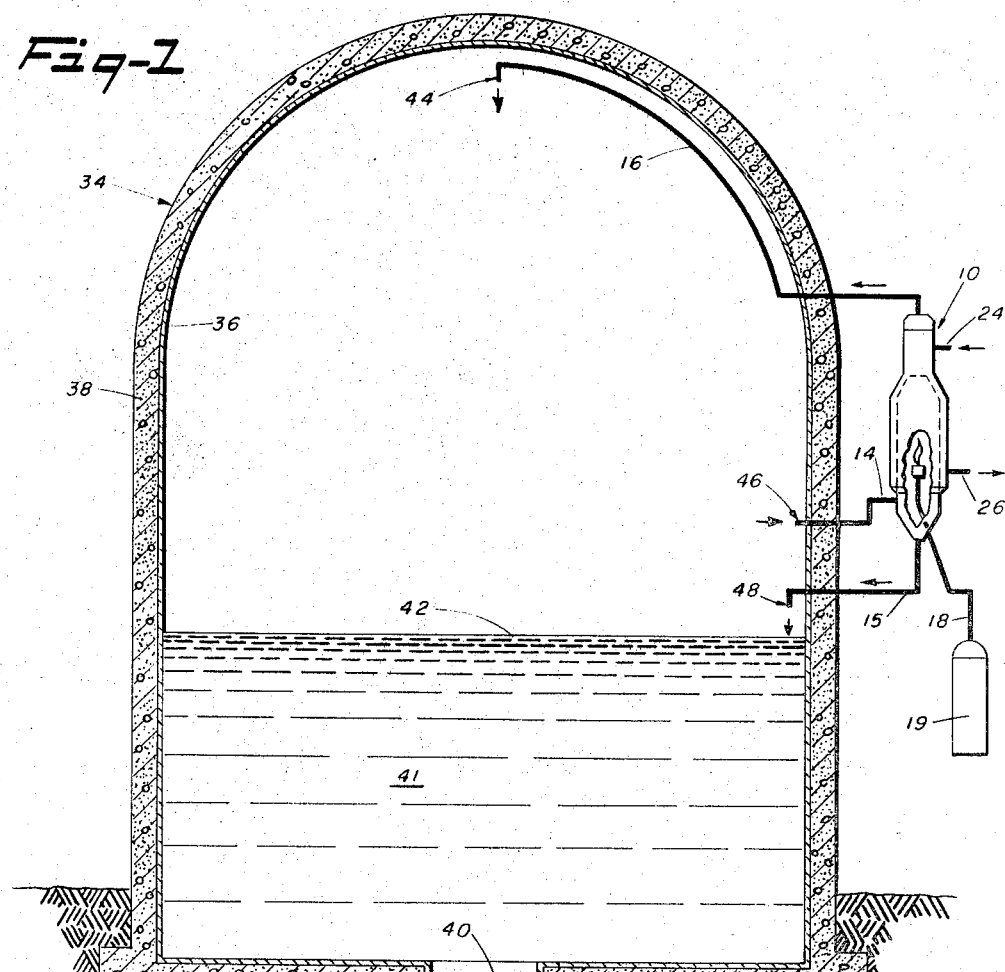

March 7, 1967 C. T. CHAVE 3,307,913
VACUUM PRODUCING APPARATUS FOR CONTAINMENT VESSELS
Filed July 27, 1962

INVENTOR.
CHARLES T. CHAVE
BY
MORGAN, FINNEGAN, DURHAM & PINE
ATTORNEYS

United States Patent Office

3,307,913
Patented Mar. 7, 1967

3,307,913
VACUUM PRODUCING APPARATUS FOR
CONTAINMENT VESSELS
Charles T. Chave, Wellesley, Mass., assignor to Stone &
Webster Engineering Corporation, Boston, Mass., a
corporation of Massachusetts
Filed July 27, 1962, Ser. No. 212,863
7 Claims. (Cl. 23—252)

This invention relates to containment vessels, and more particularly to a vacuum producing apparatus for use with containment vessels for nuclear power reactors, similar devices, or lethal environments from which leakage of toxic gases, vapors, or liquids may be a problem.

The first large commercial use of nuclear reactor plants promises to be in the field of electrical power generation. Since nuclear reactor powered generating plants should be located in close proximity to heavily inhabited areas for economic reasons, it is essential for the general safety of the adjacent populace that such reactor plants be enclosed within suitable containment vessels. The containment vessel surrounds the nuclear reactor and prevents the leakage of radioactive liquids, gases or vapors from within the enclosure to the surrounding area both during normal operation, and more critically, in the event of certain types of nuclear incidents.

The release of even extremely small quantities of radioactive materials from containment vessels built with the best available degree of leaktightness may be prohibitive in certain localities, and particularly so in or near populous cities, such as are likely to have the requirement for and financial resources to construct nuclear power stations. The failure of conventional containment vessels, such as those constructed from concrete with a steel liner, to provide sufficient leaktightness to prevent the escape of an unacceptable, even though small, amount of radioactive material in the event a nuclear incident has created the need for this invention.

Accordingly, it is a primary object of this invention to provide a means for producing a partial vacuum in a containment vessel for nuclear reactors and the like that will prevent gas and vapor leakage from the containment vessel in the event of a nuclear incident.

It is also an object of this invention to provide means for producing a partial vacuum in a nuclear containment vessel that achieves a containment vessel system that permits a reactor to be sited at any desired location, even in heavily populated areas, without fear of containment vessel leakage in the event of a nuclear incident.

Another object of this invention is to provide means for producing a partial vacuum in a nuclear containment vessel, which although almost completely effective in preventing any gas or vapor leakage from the containment vessel in the event of a nuclear incident, is relatively simple, easy, and inexpensive to construct.

The safety in nuclear power reactors, especially water cooled reactors, is largely dependent upon the suppression of the escape of radioactive gases to the environment from the containment vessels surrounding the reactor. Various means have been proposed to reduce the pressure of the vapor inside the reactor following a nuclear incident, such as quenching the escaping steam and hot water in cold water. This means is effective to reduce the pressure inside the vapor containment vessel and therefore reduces the driving force for the escape of gases and vapors through the wall of the containment vessel to the surrounding environment.

It is, however, an object of this invention to completely prevent escape of these dangerous materials by providing means for producing a partial vacuum inside the containment vessel that is simple and reliable.

It is a further object of this invention to provide means for producing a partial vacuum in a nuclear containment vessel which means has no moving parts and nothing that will wear out or corrode.

It is a still further object of this invention to provide means for producing a partial vacuum in a nuclear containment vessel which means may be used either inside or outside the vessel, and when used outside the vessel, is accessible to ensure its proper functioning and maintenance.

Additional objects and advantages of the invention will be set forth in part in the description which follows and in part will be obvious from the description, or may be learned by practice of the invention, the objects and advantages being realized and attained by means of the instrumentalities and combinations particularly pointed out in the appended claims.

In accordance with its purpose and objects, this invention provides means for producing a partial vacuum in an essentially leakproof containment vessel for nuclear reactors and the like, and is characterized by containment and control of gas and vapor leakage from the interior of the containment vessel by creation of a partial vacuum within the containment vessel, whenever the need for such containment becomes critical, such as following a nuclear incident. As embodied and broadly described, this means comprises, a burner, means for continuously introducing air from the containment vessel into the burner, means for introducing hydrogen gas into the burner, means for igniting and burning the hydrogen within the burner in the presence of air from the containment vessel, means for returning the exhaust gas from the burner to the containment vessel, means for cooling the exhaust gas to condense water vapor therein prior to return of the exhaust gas to the containment vessel, and means for draining condensed water vapor from the burner. By this means oxygen is continuously removed from the air in the containment vessel through its chemical combination with hydrogen to form water vapor, and a partial vacuum in the containment vessel is thereby induced.

The invention consists in the novel parts, constructions, arrangements, combinations and improvements shown and described.

The accompanying drawings which are incorporated in and constitute a part of this specification, illustrate one embodiment of the invention and together with the description, serve to explain the principles of the invention.

Figure 2:
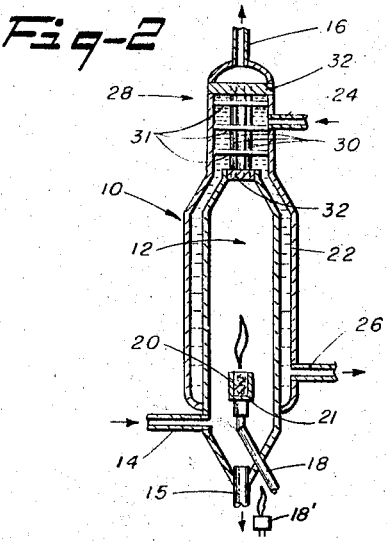
Figure 3:
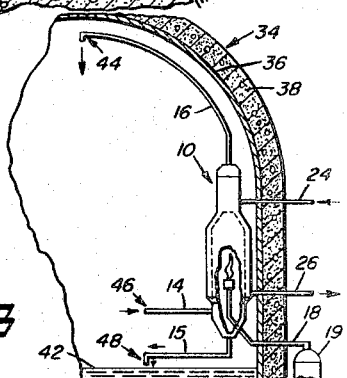

Of the drawings:
FIG. 1 is a sectional side elevation view of the containment vessel showing one possible location for the vacuum producing means;
FIG. 2 is a view of one embodiment of the vacuum producing means, shown partially in section; and,
FIG. 3 is a fragmentary side sectional, elevational view of the containment vessel of FIG. 1 showing another possible location for the vacuum producing means.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

In accordance with the invention, a containment vessel and means for producing a vacuum in the containment vessel are provided. The invention is characterized by the containment and control of gas and vapor leakage from the interior of a nuclear containment vessel by the creation of a partial vacuum within the containment vessel.

As embodied, the means for achieving the partial vacuum in the containment vessel comprises, generally, a burner 10. The burner 10 in turn comprises, as best shown in FIG. 2, a sealed combustion chamber 12, an air inlet line or conduit 14 to admit air from the containment vessel to the combustion chamber of the burner, and an exhaust gas outlet line or conduit 16 at the top of the burner. As embodied, the burner 10 also comprises an inlet line or conduit 18 from a source of hydrogen gas 19 (FIG. 1), a platinum sponge 20 for ignition of the hydrogen gas within the combustion chamber 12, a cooling jacket 22 substantially surrounding the combustion chamber 12 of burner 10, and a cooling water inlet 24 at the upper end of the cooling jacket 22, and a cooling water outlet 26 at the lower end of the cooling jacket 22.

Also, as embodied, a heat exchanger 28 is provided adjacent the exhaust gas outlet line 16, and this heat exchanger comprises a series of conventional cooling tubes 30, baffles 31, and tube supports 32. A water drain line or conduit 15 is provided at the lower end of the combustion chamber 12.

As shown in FIG. 1, and in a preferred embodiment, the vacuum producing means may be located outside of the containment vessel, shown generally at 34. The location of the vacuum producing means outside the containment vessel 34 is preferred, since when so located, the vacuum producing means or burner 10 is accessible to ensure proper functioning and to provide ease of maintenance. The vacuum producing means or burner 10 may also be located inside the containment vessel, if such an arrangement is desired.

As embodied, the containment vessel 34 comprises a substantially continuous inner steel liner 36 which is essentially leakproof during normal operation, and this steel liner 36 is surrounded by a concrete outer body 38. In the illustrated embodiment of the containment vessel, the nuclear reactor (not shown) may be partially contained in a well 40 within the containment vessel and may be substantially immersed in water that provides quenching of steam and hot water in the event of a nuclear incident. The water level in indicated at 42 in FIG. 1.

As embodied, and as shown in FIG. 1, the outlet 44 for the exhaust gas conduit 16 is located at a high point in the containment vessel, whereas the inlet 46 for the air conduit 14 is located at a fairly low point in the containment vessel air space and near the water level 42. As shown in FIGS. 1 and 2, and as mentioned above, the vacuum producing means or burner 10 also includes a water drain conduit 15 from the burner 10 so that water, condensed from the water vapor in the exhaust gas by the heat exchanger 28, may be removed from the burner 10. The outlet 48 of water drain conduit 15 is located inside the containment vessel so that the drain water is added to the cooling water surrounding the reactor.

The vacuum producing means of this invention may be operated whenever it is desired to create a negative pressure within the containment vessel to cause in-leakage of air from outside the containment vessel, and to prevent any leakage of air from inside the containment vessel to the outside. Such a negative pressure condition on the inside of the containment vessel could become immediately desirable in the event of a nuclear incident, and if the incident is serious, the vacuum producing means of this invention can be placed in operation immediately after the primary system of the reactor has ruptured and released its contents to the quenching system inside the container. The vacuum producing means of this invention will develop a negative pressure inside the containment vessel and effectively prevent leakage of any radioactive gases or vapors released by the accident to the outside atmosphere.

In operation, and in accordance with this invention, hydrogen gas is introduced into the sealed combustion chamber 12. This hydrogen gas may be ignited by a platinum sponge 20 located above the burner tip 21 (FIG. 2). Alternatively, it is possible to ignite the hydrogen by preheating the inlet line 18 from the hydrogen source to a high temperature, using external burners 18' for this purpose. Air is drawn through the air inlet line 14 (FIGS. 1 and 2), and the hydrogen is oxidized by the oxygen content of the air, or the hydrogen reacts with the oxygen, combustion of the hydrogen occurs, and the hydrogen and oxygen combine to form water vapor ($H_2O$); a certain amount of oxygen is thereby removed from the air.

The exhaust gas is then transmitted through the exhaust gas line 16 and is exhausted near the top or at a high point 44 in the containment vessel. Since the exhaust gas is richer in nitrogen than the supply air, which is drawn from a lower point 46 in the containment vessel, and since the molecular weight of nitrogen is less than that of oxygen, this slight difference in the molecular weight of the exhaust gas and the supply air is sufficient to cause flow and circulation of the gas through the vacuum producing means or burner 10. The warmth of the exhaust gas also aids in this flow and circulation.

The continuous combustion of the hydrogen by reaction with oxygen in the supply air will gradually exhaust the oxygen in the containment vessel and reduce the volume of air to cause a negative pressure within the vessel.

The water vapor, as the combustion product of the hydrogen and oxygen, is removed from the exhaust gas by the heat exchanger 28, which condenses the water vapor, and this condensed vapor or water is drawn off through the water drain 15 and added to the water within the containment vessel.

The flame may be maintained within the vacuum producing apparatus or burner 10 down to about 5 percent oxygen content in the supply air. This means that approximately 15 percent of the total volume of air in the containment vessel may be removed by the combustion process of the vacuum producing apparatus. A containment vessel for a nuclear power plant of about 400 electrical megawatts would have a total volume in the order of 1,300,000 cubic feet. Therefore, the combustion process of the vacuum producing apparatus could effectively remove about 195,000 cubic feet of air. The normal leak rate for such a containment vessel would be in the order of 100 cubic feet per hour. On this basis, a negative pressure could be maintained inside the container for over eighty (80) days. Long before this time had passed, solid gas absorption devices could be put into operation which would remove the radioactive constituents of the gas inside and permit the container to be opened and entered.

As shown in FIG. 3, the vacuum producing means or burner 10 is located inside the containment vessel. The cooling water inlet and outlet lines 24 and 26, respectively, traverse both the inner steel liner 36 and the concrete outer body 38 from the exterior of the containment vessel 34 to the burner 10, as does the hydrogen inlet line 18 leading from the hydrogen source 19. Except for the fact that the burner 10 is located inside the containment vessel, the operation of the vacuum producing means in the embodiment of FIG. 3 is in all respects the same as the operation of the burner 10 in the embodiment of FIGS. 1 and 2.

This invention thus provides a new and useful result in containment vessels characterized by containment and control of gas leakage from the interior of the containment vessel by creation of a partial vacuum within the containment vessel when desired, such as, after a nuclear incident. The invention achieves this result by a relatively simple, effective, inexpensive, and reliable vacuum producing means, which may be placed in operation immediately following a nuclear incident to create a negative pressure within a containment vessel and prevent leakage of any radioactive gas from the inside of the containment vessel to the atmosphere. The vacuum producing means provided by this invention has no moving parts and nothing that will wear out or corrode; it thus furnishes a practically fool-proof device for creating a negative pressure within a containment vessel.

The invention in its broader aspects is not limited to the specific mechanisms shown and described, but also includes within the scope of the accompanying claims any departures made from such mechanisms which do not depart from the principles of the invention and which do not sacrifice its chief advantages.

What is claimed is:

1. In containment vesels for nuclear reactors and the like, the combination comprising a containment vessel, a burner having a combustion chamber, means having an inlet within the containment vessel for continuously introducing air from the containment vessel into the combustion chamber of the burner, means for introducing hydrogen gas into the combustion chamber of the burner, means for igniting and burning the hydrogen within the combustion chamber of the burner as an open flame and in the presence of air introduced from the containment vessel, means having an outlet within the containment vessel for returning the exhaust gas from the burner to the containment vessel, the outlet of the means for returning the exhaust gas from the burner to the containment vessel being located at a high point within the containment vessel and the inlet of the means for continuously introducing air from the containment vessel into the burner being located at a lower point within the containment vessel, means for cooling the exhaust gas to condense water vapor therein prior to return of the exhaust gas to the containment vessel, and means for draining condensed water vapor from the combustion chamber of the burner, whereby oxygen is continuously removed from the air in the containment vessel through its chemical combination with the hydrogen to form water vapor, and a partial vacuum in the containment vessel is thereby induced.

2. The invention as defined in claim 1, in which the burner is located within the containment vessel.

3. The invention as defined in claim 1, in which the burner is located outside of the containment vessel.

4. The invention as defined in claim 1, in which means are provided for pre-heating the means for introducing hydrogen gas into the burner whereby the hydrogen gas may be preheated before it is introduced into the burner to ensure its ignition upon contact with the air in the burner.

5. The invention as defined in claim 1, in which the means for cooling the exhaust gas to condense water vapor therein is a water-cooled heat exchanger.

6. The invention as defined in claim 1, in which a quenching water bath is contained in the containment vessel, and in which the means for draining condensed water vapor from the burner includes an outlet within the containment vessel, whereby the water from the drain is added to the quenching water in the containment vessel.

7. In containment vessel systems for nuclear reactors and the like, the combination comprising a containment vessel containing a large volume of air, a burner having a sealed combustion chamber, means having an inlet within the containment vessel for feeding air into the combustion chamber of the burner, a source of hydrogen gas, means for feeding hydrogen gas into the combustion chamber of the burner, means for igniting the hydrogen gas within the burner and burning the hydrogen within said combustion chamber as an open flame and in the presence of air introduced from the containment vessel, means having an outlet within the containment vessel for conducting exhaust gas from the combustion chamber of the burner to the containment vessel, the outlet of the means for conducting exhaust gas from the combustion chamber of the burner to the containment vessel being located at a high point within the containment vessel and the inlet of the means for feeding air from the containment vessel into the combustion chamber of the burner being located at a lower point within the containment vessel, heat exchanger means for cooling the exhaust gas to condense water vapor therein prior to return of the exhaust gas to the containment vessel and means for draining water from the combustion chamber of the burner, whereby oxygen is continuously removed from the air in the containment vessel through its chemical reaction with the hydrogen to form water vapor, and a partial vacuum in the containment vessel is thereby induced.

References Cited by the Examiner

UNITED STATES PATENTS

| 1,547,688 | 7/1925 | Romanelli | 23—281 |
| 2,986,641 | 5/1961 | Michels | 23—210 |
| 3,155,310 | 11/1964 | Lorenz | 230—69 |

FOREIGN PATENTS

| 1,096,538 | 1/1961 | Germany. | |

MORRIS O. WOLK, *Primary Examiner.*

D. E. GANTZ, J. H. TAYMAN, *Assistant Examiners.*